April 29, 1947.  P. F. HACKETHAL  2,419,893
CONSTANT SPEED PROPELLER MECHANISM
Filed Oct. 14, 1943  2 Sheets-Sheet 2
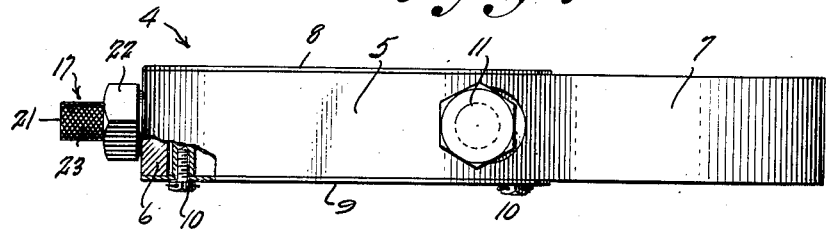
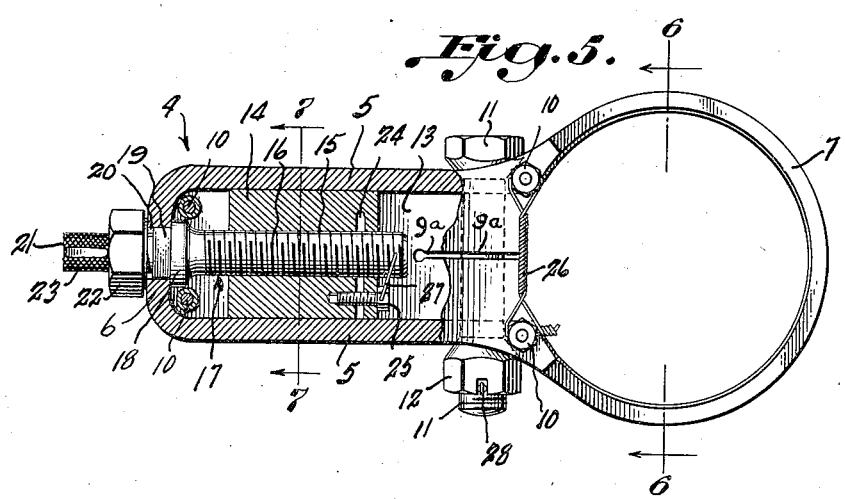
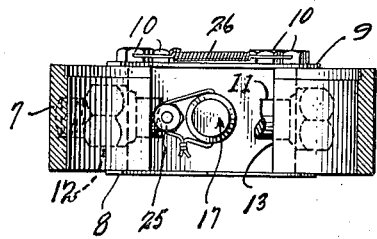
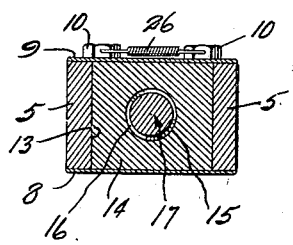
Inventor
PAUL F. HACKETHAL
By Semmes, Keegin Beale & Semmes
Attorneys Patented Apr. 29, 1947

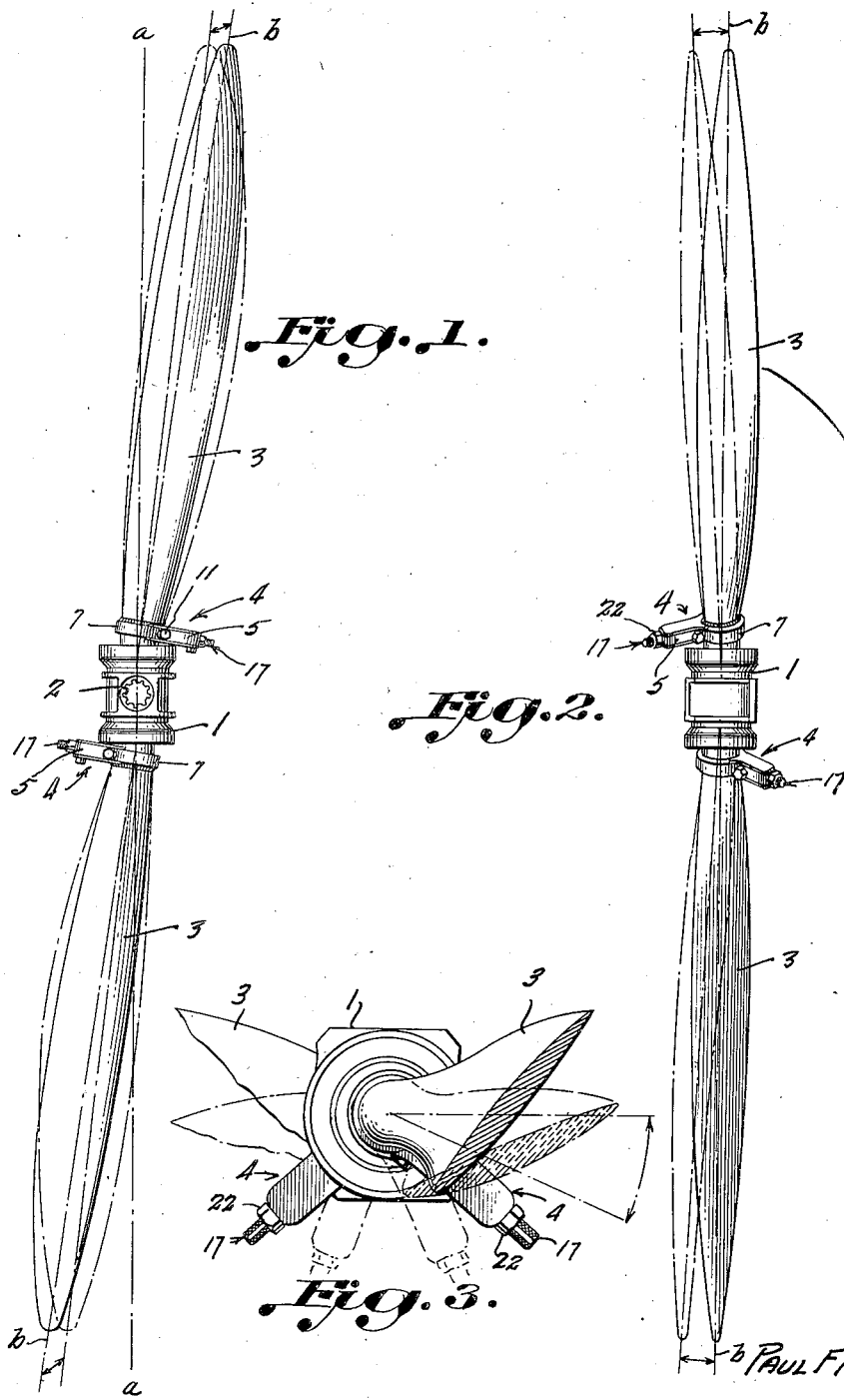

2,419,893

UNITED STATES PATENT OFFICE 2,419,893

CONSTANT SPEED PROPELLER MECHANISM

Paul F. Hackethal, Cockeysville, Md., assignor to Everel Propeller Corporation, Baltimore, Md., a corporation of Maryland Application October 14, 1943, Serial No. 506,257

4 Claims. (Cl. 170—162)

This invention relates to propellers, and more particularly has reference to a counterweight construction therefor. The invention finds particular application in a propeller of the variable pitch type, either controllable or automatic.

I shall describe my invention in connection with an automatic variable pitch propeller which controls the rotary speed of the propeller, where a counterweight arm is resorted to in order to modify the quantitative value of the pitch varying moments in such a manner that the sum of all forces acting upon the blade will regulate the pitch setting of all attitudes of the plane to maintain the desired R. P. M. of the propeller.

The weight of the counterweight, its distance from the blade gravity axis, and its angular position with respect to the face of the blade are all extremely critical, and slight variations in any one of these respects will seriously modify the prescribed operation of the blade.

The principal object of this invention, therefore, is to provide a construction which permits ready adjustment to secure the desired positioning and distribution of the counterweight.

Yet another object of this invention is to provide a counterweight of simple and economical design and which provides for an easy and accurate adjustment of the counterweight.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 1 is a front elevation of an automatic variable pitch speed-controlling propeller equipped with a counterweight construction embodying my inventive concept.

Figure 2 is a side elevation of the propeller shown in Figure 1.

Figure 3 is a cross sectional view of a propeller blade, showing the hub and counterweight in plan.

Figure 4 is a side view of the counterweight construction.

Figure 5 is a bottom plan view of the counterweight construction with a portion thereof in section.

Figure 6 is a view taken along the line 6—6 of Figure 5 looking in the direction of the arrows.

Figure 7 is a view taken along the line 7—7 of Figure 5 looking in the direction of the arrows.

While, as stated above, my invention is not limited to an automatic variable pitch propeller of the speed-controlling type, it does find particular application with such a propeller, and I have illustrated the counterweight in connection with that type of propeller. For instance, in Figure 1, there is disclosed a hub designated generally 1 which is provided with a splined recess 2 for coupling the hub to a drive shaft (not shown). As indicated in Figures 1-3, the hub 1 is provided with sockets in which the blades 3 are rotatably mounted. The axis of rotation of the blades within the hub sockets is indicated by the dotted line $a$—$a$, but it will be noted that the longitudinal axis of each blade, indicated by the dotted line $b$, is angularly disposed with respect to such axis of rotation. Consequently, rotation of the blade within the hub socket causes the face of the blade to traverse the cone of an arc, the apex of which is the line $a$—$a$.

It will be appreciated from the above that as each blade rotates within the socket of the hub 1, pitch of the blade is varied. This is best shown by Figure 3 in which the blade 3 is shown in one position by the solid lines, while the dotted lines thereof indicate the blade in a different position upon the cone arc. It can be readily seen that the pitch of the blade in these two positions varies with the change in position of the blade.

My invention, as stated above, relates primarily to a counterweight construction which is designated generally by the numeral 4. This construction will now be described in more detail.

As best illustrated in Figure 5, the counterweight arm comprises flat parallel side members 5 which are joined together at one end by transverse portion 6. The opposite ends of the side members 5 are formed into an annulus 7 by means of which the arm may be attached to the shank of the blade 3. Secured to one face of the side members 5 is a sheet-like plate 8 which extends from the end 6 to adjacent the annulus 7, the end of the plate 8 being curved to correspond to the curvature of the annulus. This plate may be permanently secured to the arm by welding, brazing or otherwise suitably attaching.

On the opposite face of the members 5 is removably attached a similar plate 9 by any suitable means such as cap screws 10.

The plates 8 and 9 are slit longitudinally as indicated at 9a from the ends which lie adjacent the annular portion 7 to provide a certain amount of flexibility to the structure and thereby permit the annular portion 7 to be constricted about the shank of the blade. To constrict this portion and rigidly secure the arm in a desired angular position with respect to the blade, a bolt 11, which passes transversely through the side members 5 adjacent their juncture with the annular portion 7, is provided with a nut 12.

The side members 5, end wall 6 and side plates 8 and 9 constitute a substantially rectangular recess 13 extending, when the arm is attached to the propeller blade, radially with respect to the blade axis. Mounted for sliding movement within the recess 13 is a weight member 14 substantially rectangular in shape and closely engaging the inner surfaces of the recess.

In order to adjust the position of the weight with respect to the arm, the weight member is provided with a longitudinal internally threaded aperture 15 adapted to receive the threaded end 16 of a stud member 17 positioned longitudinally within the recess. The stud member 17 passes through the end wall 6 and is provided with an integral collar 18 adjacent which is a squared shoulder 19. The shoulder 19 is adapted to engage a squared aperture 20 in the end wall 6 and, when so engaged, prevents rotation of the stud. Adjacent the squared shoulder 19, the stud is provided with an extension 21, the intermediate portion of which is threaded to receive a nut 22 and the outer portion knurled, as shown at 23, to provide finger engaging means for effecting rotation of the stud, as will be later described.

In order to increase the frictional engagement between the weight member 14 and the stud 17 to prevent play or back-lash in the threaded engagement between these two elements, the weight may be provided adjacent one end with a lateral slot 24 which traverses the threaded aperture 15. The weight is bored longitudinally and threaded from the end in which the slot is provided, which bore is provided with a screw 25. By means of this structure, when the screw 25 is drawn up, the aperture 15 adjacent the end of the weight will be somewhat distorted, cramping the internal screw threads into closer engagement with the external threads of the stud.

Suitable locking means such as indicated by the wires 26 for the screws 10, the wire 27 for the screw 25 and key 28 for the nut 12 may be provided to prevent accidental loosening or removal of these threaded elements.

The size and weight of a weighted member 14 and the length of the arm are selected, and the weight is positioned in the recess 13 according to requirements for a particular propeller installation. The counterweight arm is attached to the blade shank and adjusted angularly to the correct position with respect to the face of the blade and secured in place by constricting the annular portion about the shank of the blade. When thus assembled, and the propeller put in operation, the counterweight arm should actuate the blade pitch changing mechanism to a predetermined pitch changing performance—that is, the pitch setting should be automatically regulated so that a desired constant propeller R. P. M. will be maintained within very close limits at all attitudes of the plane. Should, however, the R. P. M. of the propeller vary slightly from the desired figure, the weight 14 may be easily adjusted toward or away from the blade to vary the effect of the counterweight. This may be simply accomplished by removing the plate 9, holding wire 27, and loosening screw 25, then backing off the nut 22 sufficiently so that the squared portion 19 will clear the squared aperture 20 and thereby permit rotation of the stud 16. The stud 16 may be then turned in either direction to move the weight 14 either toward or away from the blade. After adjusting the position of the weight, it may then again be rigidly secured in place by again drawing the nut up on the stud to reengage the collar with the end wall 6 and the shoulder 19 with the aperture 20 to prevent further displacement of the weight. For all practical purposes, a squared shoulder 19 cooperating with a squared aperture will give a fine enough adjustment of the mechanism. However, should a smaller degree of adjustment be found necessary, it would be obvious that the shoulder 19 may be made either hexagonal, heptagonal, octagonal or cross sections of other numbers of sides.

From the above, it will be seen that I have provided a simple, easily manufactured and easily adjustable counterweight mechanism which will effectively modify the quantitative value of blade turning moments to effect a desired constant rotational speed of a propeller for changing attitudes of flight. By means of the counterweight structure incorporated in this invention, slight unavoidable variations in manufacturing, such as variations in the length and weight and mass distribution of the counterweight, may be easily compensated for by a simple adjustment in the counterweight mechanism.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A variable pitch propeller comprising a hub, a blade mounted in said hub for pivotal pitch changing movement, and a counterweight construction including an arm having a longitudinal recess therein having parallel side walls, a constrictable annulus formed as a continuation of said side walls for attaching the arm to the shank of the blade, a weight member slidably positioned in the recess and engaging said walls, a screw member carried by the arm and positioned within the recess and having an operative engagement with the weighted member for moving the weighted member longitudinally in said recess, a squared shoulder on the screw member, and a squared aperture in the arm of the same size as the shoulder and adapted to receive the same.

2. A variable pitch propeller comprising a hub, a blade mounted in said hub for pivotal pitch changing movement, a counterweight carriage, including a clamping ring for mounting the carrier on the shank of the blade, for adjustment circumferentially of the blade, a counterweight mounted on said carrier for movement radially with respect to the blade, said counterweight being fixed against rotation in said carrier and having a threaded bore therein extending longitudinally of the direction of movement thereof, a threaded stud enthreaded in said bore and having a head extending through an opening in a portion of the carrier remote from the blade, a shoulder on the stud for engagement with the portion of the carrier surrounding the opening to limit axial movement of the stud with respect to the carrier, means for drawing said shoulder against said portion of the carrier, and cooperating means on the stud and carrier to prevent rotation of the stud relative to the carrier when the shoulder is drawn against the carrier.

3. A variable pitch propeller comprising a hub, a blade mounted in said hub for pivotal pitch changing movement, a counterweight carrier formed of a band surrounding the shank of the blade with the major portion thereof embracing the blade shank and a smaller portion thereof extending radially outwardly from said blade shank, said latter portion forming a housing having two parallel spaced walls connected by an end wall remote from the blade, means for clamping the blade shank embracing portion of the band to the blade, a counterweight non-rotatably mounted in said housing for sliding movement radially of said blade shank, said counterweight having a threaded bore therein extending longitudinally of the direction of movement thereof, a threaded stud enthreaded in said bore and having a head extending through an opening in the end wall, said stud having a shoulder adjacent the head for engagement with the end wall to limit outward movement of the stud through said opening, means on the stud and end wall cooperable when the shoulder is against the end wall to prevent rotation of the stud in the opening in the end wall, and releasable means for maintaining the shoulder against the end wall, said releasable means being releasable to free the stud for axial and rotary movement relative to the housing and counterweight.

4. A variable pitch propeller comprising a hub, a blade mounted in said hub for pivotal pitch changing movement, a counterweight carrier formed of a band surrounding the shank of the blade with the major portion thereof embracing the blade shank and a smaller portion thereof extending radially outwardly from said blade shank, said latter portion forming a housing having two parallel spaced walls connected by an end wall remote from the blade, a counterweight non-rotatably mounted in said housing for sliding movement to and from said blade shank, means for effecting such sliding movement of the counterweight, and a bolt passing through the spaced walls at a point adjacent the shank-surrounding band to thereby clamp the band to the blade and aid in fixing the counterweight in the housing.

PAUL F. HACKETHAL.

REFERENCES CITED

The following references are of record in the file of this patent:

UNITED STATES PATENTS

| Number | Name | Date |
|---|---|---|
| 1,952,799 | Havill | Mar. 27, 1934 |
| 1,952,801 | Havill | Mar. 27, 1934 |
| 2,032,255 | Caldwell | Feb. 25, 1936 |
| 416,253 | Bordman | Dec. 3, 1889 |
| 713,725 | Waldron | Nov. 18, 1902 |
| 1,968,844 | Leon | Aug. 7, 1934 |
| 2,083,569 | Larson | June 15, 1937 |
| 1,770,601 | Baker | July 15, 1930 |
| 1,977,031 | Zipay | Oct. 16, 1934 |
| 1,825,610 | Wood | Sept. 29, 1931 |
| 2,362,914 | McLeod | Nov. 14, 1944 |
| 1,903,817 | Johnson | June 15, 1937 |

FOREIGN PATENTS

| Number | Country | Date |
|---|---|---|
| 13,052 | British | 1895 |